United States Patent [19]
Johnson

[11] Patent Number: 5,220,879
[45] Date of Patent: Jun. 22, 1993

[54] LINKABLE FENDER

[76] Inventor: Patrick M. Johnson, Lower Quay, Gweek Cornwall TR12 6UD, England

[21] Appl. No.: 777,906

[22] Filed: Oct. 17, 1991

[30] Foreign Application Priority Data

Oct. 17, 1990 [GB] United Kingdom ............ 9022534

[51] Int. Cl.$^5$ .................................... B63B 59/02
[52] U.S. Cl. .................................... 114/219
[58] Field of Search ............ 403/298, 315, 331, 380; 114/219, 264, 265, 267; 441/35

[56] References Cited

U.S. PATENT DOCUMENTS

| | | | |
|---|---|---|---|
| 792,979 | 6/1905 | Fulghum | 403/331 |
| 3,221,696 | 12/1965 | Gardener | 441/35 |
| 3,498,252 | 3/1970 | Peacock | 114/219 |
| 3,540,403 | 11/1970 | Russell | 114/219 |
| 3,688,728 | 9/1972 | Lederer | 114/219 |
| 3,822,499 | 7/1974 | De Vos | 114/267 |
| 3,861,345 | 1/1975 | Hull | 114/219 |
| 4,126,006 | 11/1978 | Lewis | 403/298 |
| 4,142,342 | 3/1979 | Jungers et al. | 403/298 |

Primary Examiner—Jesus D. Sotelo
Assistant Examiner—Stephen P. Avila
Attorney, Agent, or Firm—Shoemaker and Mattare Ltd.

[57] ABSTRACT

A fender, for use with a boat, comprises a resiliently deformable body having a plurality of slots formed axially of the body and adapted to receive linking pieces which can be used to join the fenders together. Resilient elements are provided to retain the linking pieces in position within the slots.

7 Claims, 3 Drawing Sheets

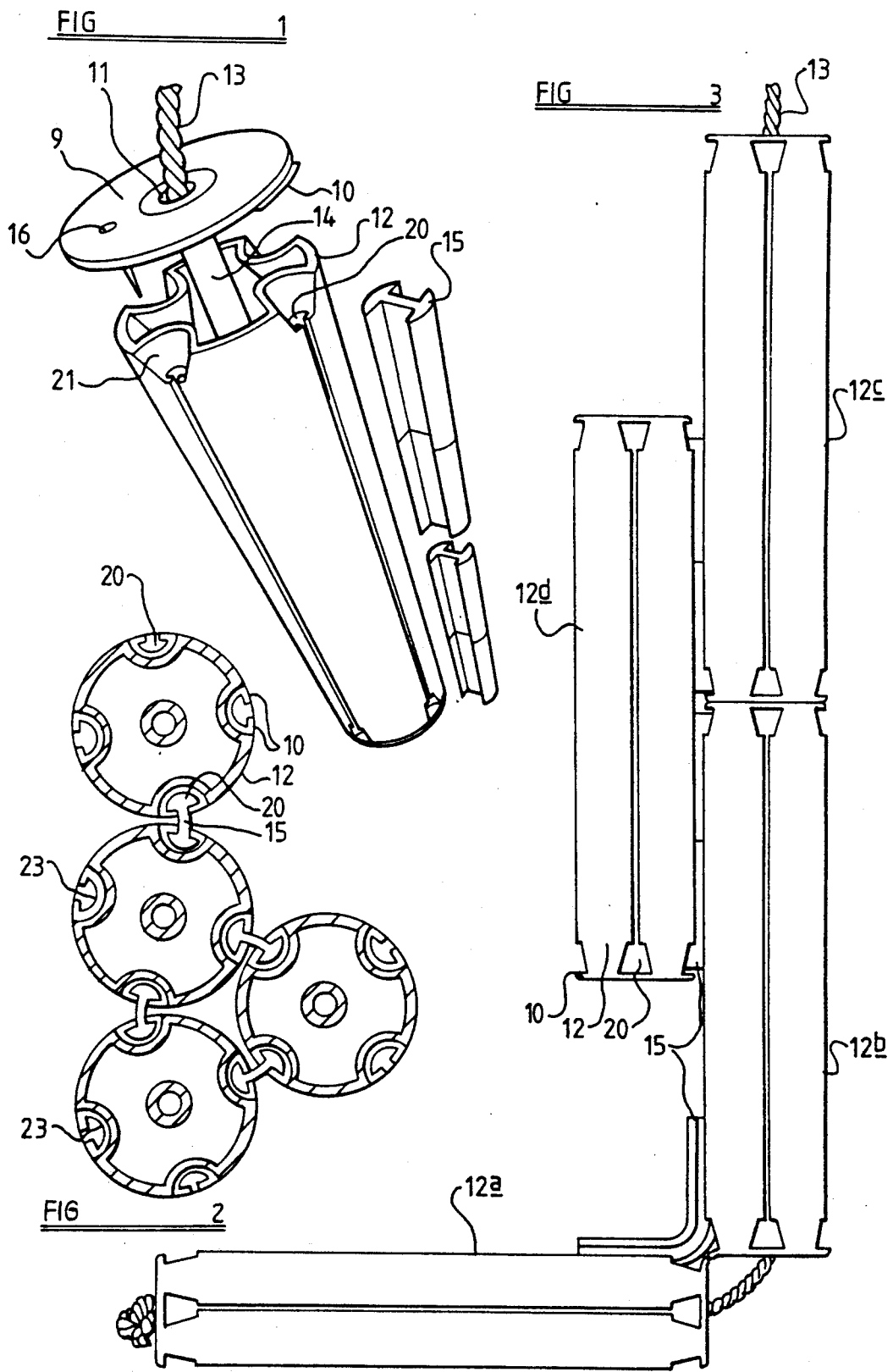

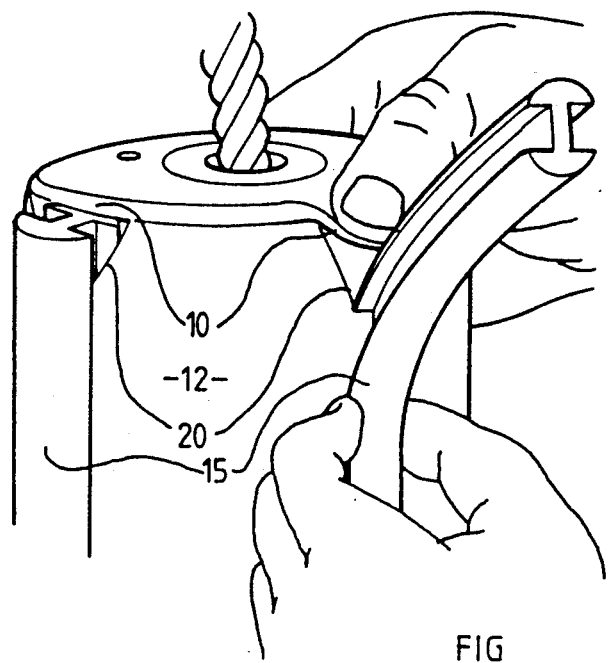
FIG 4
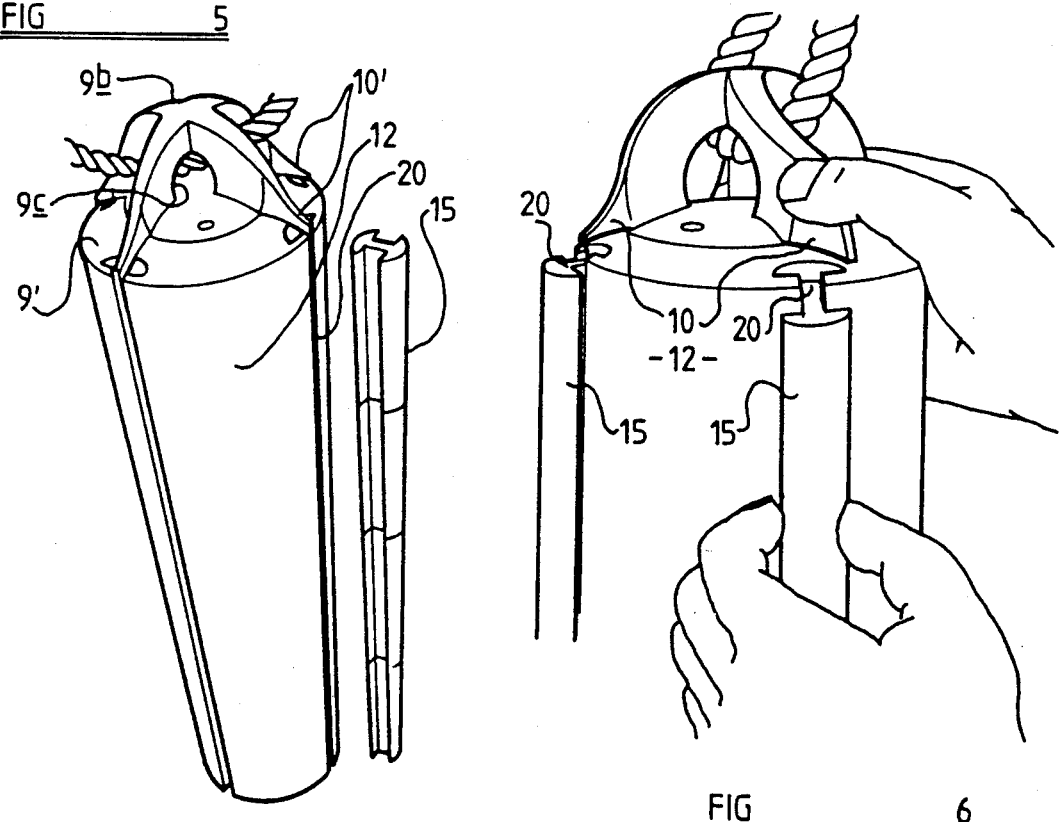
FIG 5
FIG 6

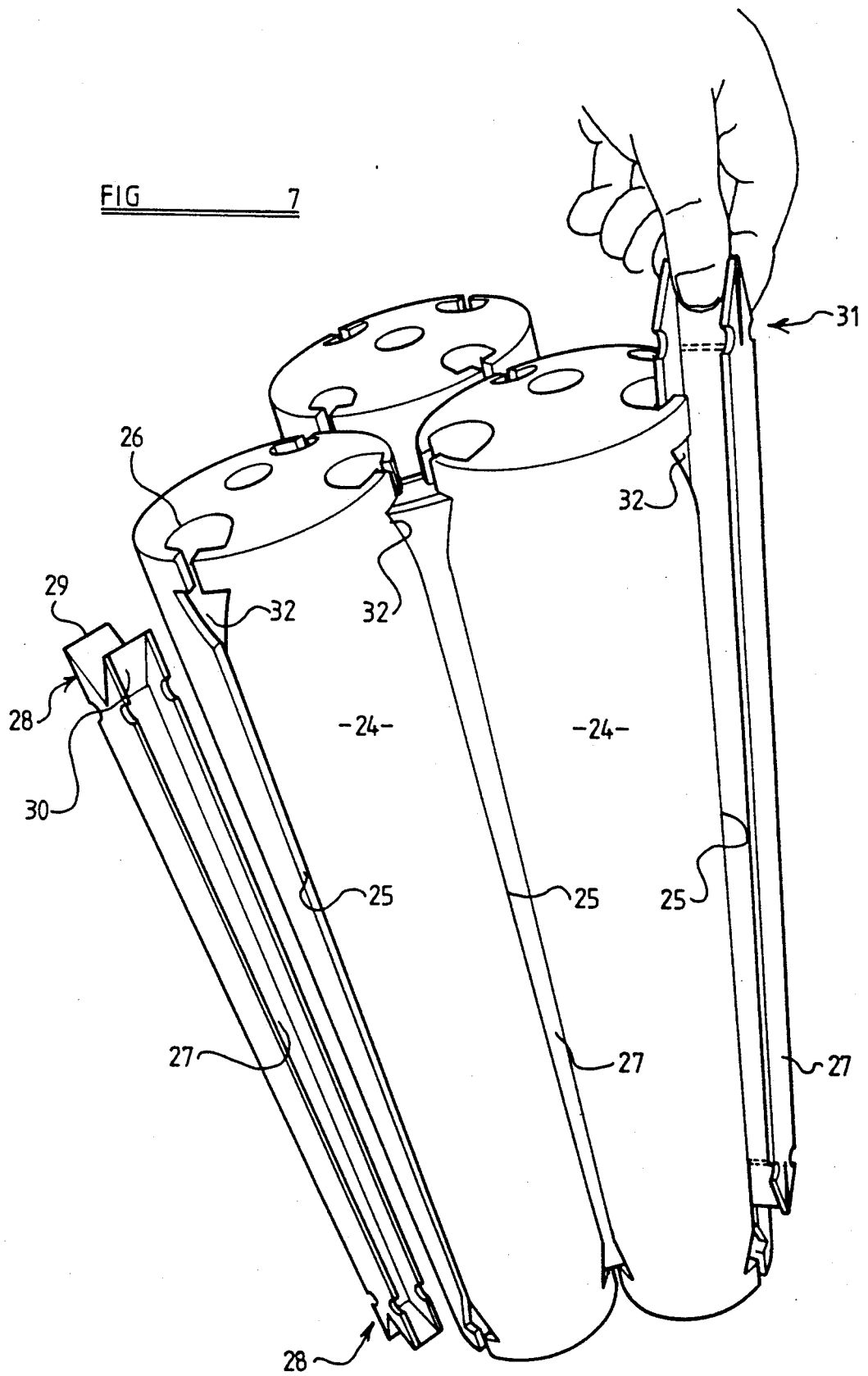

LINKABLE FENDER

BACKGROUND OF THE INVENTION

This invention relates to a linkable fender, intended to provide shock absorbency or cushioned protection between two surfaces and to a fender system incorporating such fenders.

Fenders are most commonly used in a marine environment to provide shock absorbency and cushioning between a vessel and a jetty, quay or the like or between one vessel and another. However, when the respective surface of either of the bodies to be cushioned relative to each other has awkward irregularities or there is considerable movement, large fenders or groups of fenders must be used. Large fenders take up corresponding amounts of storage space when not being used as fenders and have no other function which they can usefully serve when not in use as fenders. Where groups of individual fenders are used, these individual fenders tend to slip away from each other in use unless positively connected.

SUMMARY OF THE INVENTION

It is an object of the present invention, in one aspect, to provide an improved fender which is linkable with similar fenders.

It is another object of the invention in another aspect to provide an improved fender system.

According to this aspect of the invention, there is provided a fender comprising a resiliently deformable body having a formation for co-operation with a linking member whereby the fender can be detachably connected with a one or more further resiliently deformable fender bodies.

Preferably said resiliently deformable body is in the form of a member of substantially uniform cross-section throughout its length and having at least one longitudinally extending slot open along the peripheral surface of the member to receive a complementary linking piece for connection of the body with another resiliently deformable fender body.

This invention also provides a fender system comprising a plurality of elongate resiliently deformable bodies arranged side by side, with each said body being releasably connected with an adjoining said body by a linking piece one lateral portion of which is engaged in a longitudinal slot in one said body and the opposite lateral portion of which is engaged in a longitudinal slot in the adjoining said body.

Conveniently each said slot has a relatively narrow mouth at the peripheral surface of the respective elongate deformable body and a relatively wider region located inwardly of said mouth, and wherein the or each said linking piece is an elongate strip the two lateral portions of which are each of a cross-section complementary with said slots, whereby said strip can be introduced longitudinally into adjoining said slots in respective adjoining fender bodies to link such bodies together yet will resist removal laterally from said slots and thus will resist lateral separation of said bodies.

In a preferred embodiment, a fender system comprises a plurality of fender bodies, each fender body being provided with a plurality of slots, into which separate linking pieces may be removably inserted, whereby adjoining fender bodies can be linked together to form, in effect, larger fenders or fender combinations to suit particular fendering requirements. In the preferred embodiment, the fender bodies are so configured as to facilitate their use as seats or for other purposes when not required as fenders.

BRIEF DESCRIPTION OF THE DRAWINGS

Embodiments of the invention are described below by way of example with reference to the accompanying drawings in which:

FIG. 1 is an exploded perspective view of one type of inflatable fender embodying the invention, with one end removed to show the internal construction.

FIG. 2 is a cross-sectional view illustrating, by way of example, one way in which four fenders in accordance with FIG. 1 may be inter-connected by respective linking pieces, FIG. 3 illustrates, by way of further example, another way in which a plurality of fenders in accordance with FIG. 1 may be inter-connected.

FIG. 4 illustrates the manner in which linking pieces may be inserted or removed from the fender of FIG. 1, FIG. 5, illustrates, in perspective, another form of inflatable fender embodying the invention, FIG. 6 is a detailed perspective view, to a larger scale than FIG. 5, illustrating the insertion or removal of a linking piece in or from the fender of FIG. 5, and FIG. 7 is a perspective view illustrating an alternate embodiment of the invention.

DESCRIPTION OF PREFERRED EMBODIMENTS

Referring to FIGS. 1 to 3, a fender comprises an outer shell in the form of a generally tubular body 12 of flexible air-impervious plastics material, having, over most of its length, the uniform cross-section illustrated in FIG. 2, i.e. providing a cylindrical outer wall interrupted at 90° intervals by slots 20. The fender body has at each end a generally circular end cap 9, also of flexible plastics, with a central aperture 11 therein. Within the fender body, a central tube 14 extends from one end cap 9 to the other, coaxially with the outer shell, the tube 14 being sealingly connected, at each end, to the respective end cap 9 around the respective aperture 11 whereby there is defined within the fender body a sealed air-tight space of annular cross-section and whereby a rope 13 may be passed axially through the fender body, through the apertures 11 and the tube 14. The fender body is intended to be inflated to a moderate internal pressure through a valve 16 indicated in FIG. 1.

As best shown in FIG. 2, each slot 20 is relatively narrow at its mouth where it opens onto the outer periphery of the fender body but is wider inwardly of such periphery, whereby each slot 20 has an approximately "T"-shaped cross-section. In order to connect adjoining fender bodies side-by-side, use is made of linking pieces in the form of strips 15, each of uniform approximately "I"-shaped cross-section throughout its length, i.e. providing two opposite lateral portions each of "T"-shaped cross-section complementary with the slots 20. Accordingly, two adjoining fender bodies can be linked together by a linking strip 15 having one lateral "T"-section portion engaged in a slot 20 of one fender body and the other lateral "T"-section portion engaged in an adjoining slot 20 of an adjoining fender body, as illustrated in cross-section in FIG. 2. The linking strips 15 are preferably of flexible plastics material, allowing limited flexing movement between inter-connected fender bodies 12 and facilitating insertion of the strips as described below with reference to FIG. 4.

At least at one end of each fender member, and preferably, as shown, at both ends, the outer peripheral wall of the tubular body 12 is deformed inwardly to form an entry recess 21. Each end cap 9 extends over the adjoining ends of the respective slots 20, and thus over the associated recesses 21, the portions of the end cap 9 extending over such recess 21 forming respective flaps 10, which may, to increase flexibility, be made thinner and thus more pliable than the remaining portions of the end cap 9. When a linking strip 15 is to be inserted into a slot 20, the respective flap 10 is displaced, by being depressed, as shown in FIG. 4, or by being lifted, to allow the linking strip 15 to be inserted longitudinally into the slot 20. When the linking strip 15 is fully inserted, the flap 10 is released to extend over the adjoining end of the inserted linking strip 15 and thus prevent inadvertent displacement of the linking strip 15 from its slot 20.

FIG. 2 illustrates in plan, by way of example, how four fenders according to FIG. 1 may be interconnected using linking strips 15. It will be noted that the flexibility of the central webs of the linking strips 15 permits, for example, three fender bodies to be connected in a triangular formation (despite the fact that the slots 20 are at 90° intervals), as well as (not shown) four fender bodies to be connected in a square formation, for example. It will also be clear that a whole series of fender bodies could be connected side-by-side by such link strips 15 to form an extended flat fender or mat. Many other arrangements may of course be adopted.

The linking strips 15 need not be of the same length as the fender bodies and indeed as illustrated in FIG. 1, it may be advantageous to provide linking strips 15 which are somewhat less than half the length of the fender body, with two such strips being normally used to connect two adjacent fender bodies. FIG. 3 illustrates in plan, a fender arrangement which may be achieved utilizing, inter alia, the above-noted feature. Thus, in the arrangement of FIG. 3, fender bodies 12A, 12B and 12C are connected in series by a single rope 13 passed axially therethrough. Fender bodies 12A and 12B are further connected by a linking strip 15 having half of its length engaged in a slot 20 in the fender body 12A and the other half of its length engaged in a slot 20 in the fender body 12A and the other half of its length engaged in an adjoining slot 20 in the fender body 12B, the flexibility of the strip 15 allowing the fender bodies 12A and 12B to be disposed at an angle, for example, a right angle as shown in FIG. 3, to each other. Thus, for example, the fender bodies 12A and 12B may be extended along, for example, the side and transom respectively of a vessel with the bent strip 15 extending around the intervening edge. As illustrated in FIG. 3, adjacent axially aligned fender bodies 12B, 12C, may be connected by a further fender body 12D being connected with the fender bodies 12B and 12C by respective short linking strips 15 disposed in a slot 20 of the body 12D, one of such strips 15 being engaged in an adjoining slot 20 of the fender body 12B and the other being engaged in an adjoining slot 20 of the fender body 12C.

The outer tubular portions 12 of the fender bodies may be formed by extrusion with, (in the case of the embodiment of FIGS. 1 to 3), some post-extrusion forming at the ends of each extruded length to afford the recesses 21, the bodies 8 being subsequently secured to the caps 9 by welding, adhesive, or in any other sealing-tight manner. In order to prevent the grooves 20 from "opening out" under the inflation pressure, each groove 20 may be provided with an arcuate linear 23 as illustrated in FIG. 2, such liner being, for example, of rigid plastics or corrosion-resistant metal.

Many other configurations are possible as will be evident to the person skilled in the art and will not therefore be described in detail here.

In the variant shown in FIG. 5, no recesses 21 are formed at the ends of the fender body and the end caps, indicated at 9' in FIG. 5, have cut-away portions which register with the ends of the slots 20, the end caps 9' being without a central aperture. In this embodiment, each end cap 9' carries a retaining formation 9B which is of generally cruciform shape as viewed along the axis of the fender body, the central portion of the cruciform formation being spaced from the end cap 9' to form a space or aperture 9C through which a rope 13 may be passed as illustrated in FIGS. 5 and 6. Furthermore, a free end portion of each arm of the cruciform formation 9B, referenced 10' in FIGS. 5 and 6, is detached from the adjoining portions of the end cap 9' and extends over the free end of a respective slot 20 to retain therein any link strips inserted. Each such free end portion 10' can be displaced manually to one side of the end of the respective slot 20 as illustrated in FIG. 6 for insertion of or removal of the linking strip 15.

Whilst the fender bodies illustrated in the drawings have each four slots 20 at intervals therearound, the fender bodies may have a greater or a lesser number of slots 20, so that, for example, a system of detachably inter-connected fender bodies may each have only two slots 20, for example at diametrically opposed locations thereon. Indeed some fender bodies may have only a single slot 20. It would also be possible to provide each fender body with one or more linking strips integral therewith and one or more complementary slots, so that a plurality of such fender bodies could be connected together edge to edge, by locating an integral linking strip of each in a complementary slot of the next.

FIG. 7 illustrates a further modified embodiment of the invention. In this embodiment three fender bodies 24 are illustrated, each of the bodies being of elongate form and being formed of a foamed plastics material with an outer impervious skin. Each body is provided with four equi-angularly spaced slots 25 formed in the outer part of the body, each slot extending axially of the body. Each slot terminates, at each end of the body, with a recessed mouth 26 to facilitate the insertion of a linking strip 27 into the slot. As can be seen, each linking strip 27 is an elongate strip having a central portion which is of substantially "I" cross-section, the linking strip thus having two opposite lateral portions each of a substantially "T"-shaped cross-section which is complementary with the cross-section of the slots 25.

Each linking strip has, at each end thereof, a bifurcated region 28. In the bifurcated region 28 is effectively defined by two separate tabs 29,30 which are resiliently biassed away from each other. In order to introduce the linking strip into the slot, the tabs 29,30 are compressed between thumb and forefinger, as illustrated at 31 in FIG. 7, and then the strip is slid into position. When the pressure of the thumb and forefinger is released, the tabs 29,30 are received within a recess 32 provided for that purpose adjacent the end of the slot 25. Thus the linking strip is then retained securely in position within the slot.

In another variant (not shown) each slot 20 may have its inner wider part of substantially greater depth, radially of the fender body, than the head of the "T"-shaped formation afforded by each lateral part of a linking strip 15, to the extent that the inserted linking strip, when not in use to connect the fender body with another fender body, may be pushed radially inwardly into the slot 20 into a retracted position in which the head of the lateral formation which is not actually within the slot lies snugly against the peripheral surface of the fender body so that the latter presents a smooth relatively uninterrupted outer surface.

The fenders described with reference to the drawings can be stowed compactly in a deflated state or can be used individually or in groups as seats, formations of buoyancy arrangements or the like for both serious and recreational purposes at appropriate locations on, for example, a yacht or other craft.

I claim:

1. A fender system comprising
   a plurality of elongate resiliently deformable bodies arranged side-by-side, with each said body being releasable connected with an adjoining said body by a linking piece,
   each resiliently deformable body having a peripheral surface with at least one longitudinally extending slot formed therein,
   the linking piece being of substantially "H" cross-section, having two spaced apart lateral portions, one lateral portion of the linking piece being engaged in a longitudinal slot in one said body, and the opposite lateral portion being engaged in a longitudinal slot in the adjoining body.

2. A fender system according to claim 1 wherein each said slot has a relatively narrow mouth at the peripheral surface of the respective elongate deformable body and a relatively wider region located inwardly of said mouth, and wherein each said linking piece is an elongate strip the two lateral portions of which are each of a cross-section complementary with said slots, whereby said strip can be introduced longitudinally into adjoining said slots in respective adjoining fender bodies to link such bodies together yet will resist removal laterally from said slots and thus will resist lateral separation of said bodies.

3. A system according to claim 2 wherein each said fender body is provided with a displaceable retaining member at an end thereof, which can be resiliently displaced manually to allow longitudinal insertion of such linking strips into said slots or removal of such linking strips therefrom, and which are arranged, in an unstressed state, to return to a positon obstructing an end of the respective slot, thereby to prevent removal of the locking strip from the respective said slot.

4. A system according to claim 2 wherein each linking strip has resilient means provided at a position to engage a corresponding engagement means defined by each slot to prevent removal of the linking strip from the slot.

5. A system according to claim 4 wherein at least one end of each linking strip is bifurcated, with the bifurcated portions being resiliently biassed outwardly, each slot being provided with a recessed portion to receive the bifurcated portions of the strip.

6. A system according to claim 1 wherein each deformable body is an inflatable body.

7. A fender system comprising
   a plurality of generally cylindrical resilient bodies, each having a longitudinal axis and a plurality of circumferentially spaced, longitudinally extending "T" slots in its outer surface, and
   a plurality of connecting splines for joining said bodies together side by side, each of said splines having a substantially uniform "H" cross-section defining a pair of webs interconnected by a flexible flange, each of said webs being sized for lengthwise insertion into one of said slots.
   whereby an array of interconnected bodies can be assembled by joining respective pairs of said bodies together with respective ones of said splines.

* * * * *